United States Patent [19]
Mathurin, Jr.

[11] Patent Number: 5,473,144
[45] Date of Patent: Dec. 5, 1995

[54] CREDIT CARD WITH DIGITIZED FINGER PRINT AND READING APPARATUS

[76] Inventor: Trevor R. Mathurin, Jr., 865 Planders Ave., Uniondale, N.Y. 11553

[21] Appl. No.: 249,335

[22] Filed: May 27, 1994

[51] Int. Cl.⁶ .................................................. G06K 5/00
[52] U.S. Cl. ........................................ 235/380; 235/382
[58] Field of Search ............................. 235/380, 382, 235/382.5, 487; 382/4, 5; 356/71

[56] References Cited

U.S. PATENT DOCUMENTS

| | | | |
|---|---|---|---|
| 3,940,795 | 2/1976 | Lemelson | 360/101 |
| 4,032,889 | 6/1977 | Nassimbene | 340/146.3 E |
| 4,083,035 | 4/1978 | Riganati | 382/5 |
| 4,253,086 | 2/1981 | Szwarcbier | 340/146.3 E |
| 4,993,068 | 2/1991 | Piosenka | 380/23 |
| 4,995,086 | 2/1991 | Lilley | 235/380 |
| 5,180,901 | 1/1993 | Hiramatsu | 235/380 |

*Primary Examiner*—John Shepperd
*Assistant Examiner*—Karl D. Frech
*Attorney, Agent, or Firm*—Michael I. Kroll

[57] ABSTRACT

A credit card having thereon an actual enhanced authorized card holders finger print and corresponding digitized representation of the actual finger print, an apparatus to read the digitized finger print optically and magnetically and a method of reading the finger print optically and magnetically.

1 Claim, 3 Drawing Sheets

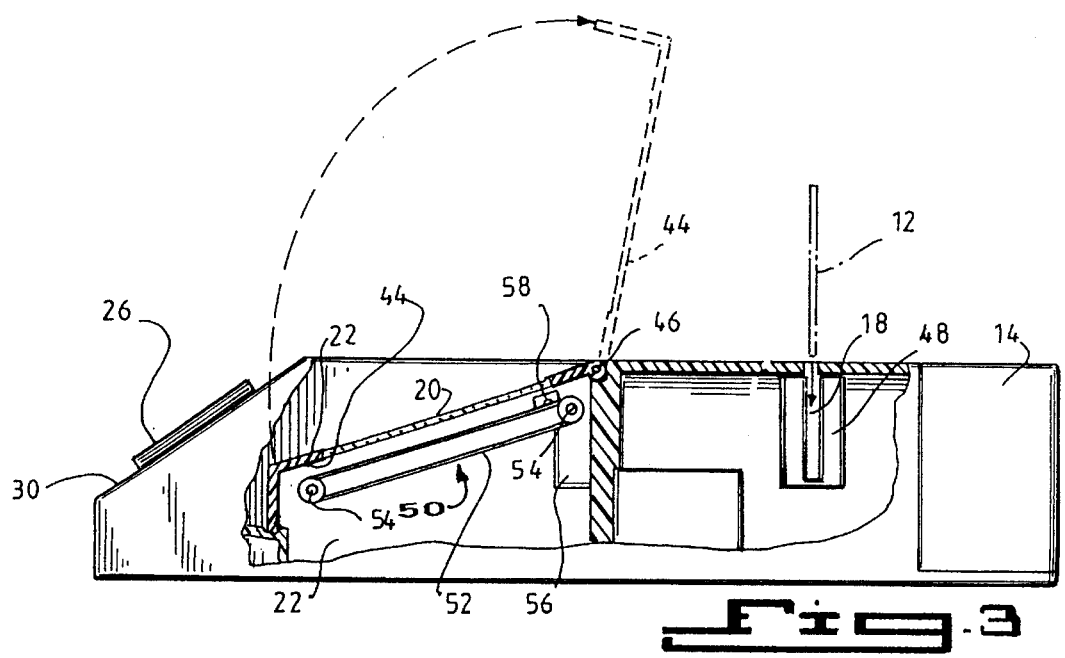
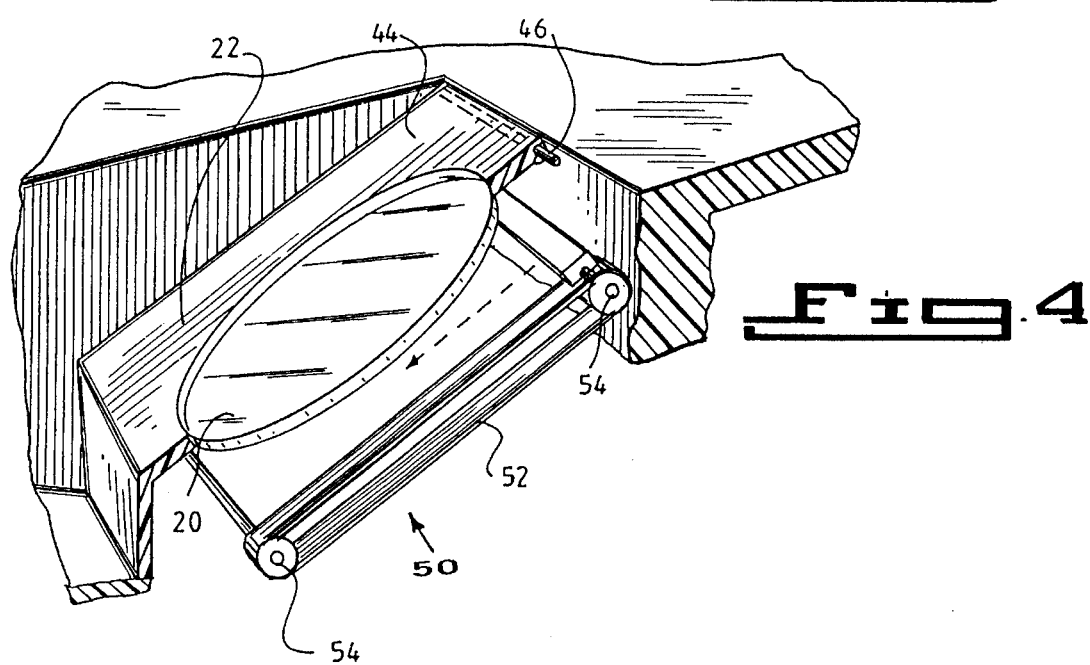

CREDIT CARD WITH DIGITIZED FINGER PRINT AND READING APPARATUS

BACKGROUND OF THE INVENTION

1. Field of the Invention

This invention relates to an anti-fraud credit card, and more particularly to such a credit card that is of the utmost simplicity, ease of use and minimum cost, while at the same time being highly effective in preventing misuse of the credit card.

The present invention relates to the manufacture of credit cards and the security of such cards until release to the end user.

The present invention relates to an improved credit card construction which is digitized finger print for facilitating identification and discouraging counterfeiting.

This invention relates to an improved credit card construction and, more particularly, to a credit card construction which includes a encoding mechanism that eliminates unauthorized use of the credit card.

The present invention relates to the detection of specified patterns within a given area and, more particularly, to a system for automatically providing an indication of the position and orientation of specified minutia in a fingerprint.

This invention relates to fingerprint comparison apparatus and, in particular, to a system using recycling FIFO buffer memories to perform parallel processing of a correlation algorithm to determine an "electronic" match between a portion of a reference fingerprint and a live fingerprint.

2. Description of the Prior Art

Increasing security problems are becoming a noticeable part of modern life, security was once primarily the preserve of classified government installations, but increasing losses and calamities have forces the review of security equipment and procedures by government and industry. Cargo losses and the theft of corporate secrets cost industry billions of dollars annually. Unauthorized access to computer data bases and other files are a major concern today and in the future. Public safety is endangered by the ability of intruders to plant bombs in places such as aircraft and buildings. Computerized records and even the computers themselves, are attacked and destroyed.

Access control and personnel identification are becoming tremendous problems, and will be the object of significant expenditures by organizations needing to identify employees, vendors, etc., who are to be allowed access to plants, computer rooms, vaults, baggage areas, etc. The ultimate method of personal identification s not a card which can be lost, loaned or stolen, nor a number code which can be told or purloined, but an unchangeable, non-transferable and indisputably unique characteristic of the person himself, his fingerprint.

With crime in the United States and elsewhere on the upswing and with the relative supply of trained law enforcement personnel on the decline, the law enforcement community has been forced, in recent years, to investigate and consider the automatic processing of the large amounts of data it is required to maintain. One area of recent interest has been in the automatic processing of fingerprints. A few facts will serve to indicate why this is the case. The Federal Bureau of Investigation has a fingerprint file which consists of over 182,000,000 fingerprint cards, each having 10 prints thereon. There are some 13,000 agencies throughout the world contributing fingerprint cards to the FBI and the FBI receives over 27,500 inquiries per day. In its Washington offices alone, the FBI has over 1000 people whose task it is to search and classify fingerprint cards. The California Bureau of Criminal Identification and Investigation has a file consisting of approximately 5,500,000 fingerprint cards and receives in excess of 95,000 inquiries per month. The New York State Identification and Intelligence System has a file in excess of 1,300,000 fingerprint cards and receives more than 200,000 inquiries per year. These figures along serve to indicate the enormity of the task of reading and classifying fingerprints for the purposes of identification and matching.

Other areas would benefit from a device for automatically reading fingerprints. For example, the economy of the United States today is based on the credit system and the use of credit cards. However, millions of dollars are lost annually because of the use of lost or stolen credit cards. With an automatic fingerprint reader and correlator, much of this could be eliminated. Each credit card could be made so that upon insertion into a machine, a central storage file would automatically locate the file of the credit cared owner which would include his or her fingerprint records. Then, by merely placing the credit card holder's finger on a glass or the like, an automatic reader could read the fingerprint and provide the information to a correlation system which would determine whether the fingerprint of the credit card holder matches those in the file of the credit card owner. With automatic reading and correlating apparatus, this could be done in a matter of seconds.

Because of the importance of this problem, many suggestions have been made in recent years for automatic fingerprint readers and recorders. Many of the proposed systems operate to locate fingerprint minutiae, such as ridge endings or bifurcations, since the use of fingerprint minutiae as a means of positive, legal identification has been proven in practice. Therefore, since the automatic detection of specified minutiae is basically a problem in pattern recognition, it would appear to be a simple matter to provide an automatic system of the detection of such minutiae. However, the recognition of these minutiae is complicated by several factors, such as: (1) the specified minutiae occur at arbitrary orientations; (2) there are variations in ridge breadth and distance between ridge centers; (3) there are various inherent defects in all fingerprints, such as scars, warts, etc.; (4) false ridge endings appear at the boundaries of fingerprints and scars; and (5) the quality of fingerprints varies widely with respect to contrast and clarity. As a result, in almost all cases, the proposed system has either been too complex, too inefficient or inoperative.

For example, it has been proposed to use a large scale computer to control the scan of a fingerprint along some predetermined pattern and so store the resulting complex electrical signal. Subsequently, in order to identify a fingerprint, it will have to be scanned and the resultant complex electrical signal compared with those in the memory banks of the computer. Although this approach may well be operative, it has the inherent disadvantage of all mass data-processing systems, and that is the requirement for enormous amounts of complex and costly equipment.

Another suggested approach has been to use holographic techniques whereby two fingerprints may be matched or the location of specified minutiae on fingerprints identified by simultaneously illuminating an unknown fingerprint and a known mask with coherent laser light and determining the locations of a match. However, apparently because of the complexity and the minute detail present in typical fingerprints, it has not been possible to make such a system which operates reliably.

The American economy, over the years in the 20th Century, has slowly but surely changed into an economy centered on credit. As a business man travels from his banks to department stores to gas stations to restaurants, the credit card that is acceptable at each one of those institutions is different in most cases from the other cards that he must carry. As a business person travels throughout this country, from state to state, or throughout the world, from country to country, he or she is more and more burdened by the large number of various types and styles of credit cards that he must carry with him.

It is known to carry credit cards that are backed by large banking organizations. Cards such as a Visa or MasterCard are but two of the examples of this modern form of credit card. Although these cards are useful in a wide variety of situations, for example purchasing goods at a store or lodging at a hotel or inn, it is not uncommon for a single individual to have three or four of each of these types, each being issued by a different bank.

Another problem that may exist is when a card is first issued, a small figure, for example $500 or $600, is established as a line of credit. However, as time proceeds and the individual proves to be a good credit risk, that line of credit is expanded to an amount $2,000 to $5,000. It is very often difficult, when one person has four or five Visas or MasterCards, for that person to remember what credit limit applies to which card. More times than not, for a particularly large purchase, an individual might at first try to use a card that does not have sufficient credit on it, to the embarrassment of the card holder, even though he does have two or three other cards that do have sufficient credit on them.

Even though a person can get a bank credit card, this does not preclude the use of three or four cards from typically local establishments. While in the most part these establishments are department stores, and usually very large department stores at that, they are regional in their use. Therefore, a person traveling from the East Coast to the West Coast would find that he or she could no longer make purchases in a well-known department store on the West Coast because his credit reputation is known only to the East Coast department stores.

Plastic cards have gained great popularity in recent years as a medium by which purchase money is paid and business transacted without the necessity of carrying cash or enduring a long term escrow or other means for transferring title or securing payment of cash. With the popularity and ready acceptance of credit cards in the business world, the use thereof by unscrupulous persons to make unauthorized transaction has become a serious problem costing the consumers millions of dollars annually. As the demand for such cards has risen amongst counterfeiters and other illegal uses, the demand for improperly obtained cards market has skyrocketed thus creating an extremely high incentive for dishonest employees connected with the manufacture of such cards to succumb to temptation. Such employees are presented daily with a temptation to supply cards to persons bent on improper use thereof, all for great sums of money.

There have been many efforts in the past to assure the security of credit cards, including coding thereof for check at the point of purchase to determine if the card may be a stolen card. Other efforts have led to the construction of credit cards with a hologram strip secured to the face thereof and incorporating optical images characteristic of the particular card such that a merchant or other person to whom the card is presented will have an opportunity to examine the card to determine if the hologram is in position and to identify the characteristics of the images incorporated therein.

While many efforts have been made to provide security against illegitimate use of stolen credit cards, little effort has been made, and even less success achieved, to provide security at the place of manufacture and storage of such cards prior to distribution to the end user. Consequently, there exists a need for a method of manufacture and a credit card which discourages theft by employees yielding to the temptation to supply such cards to others or to use the cards themselves for illegitimate purposes.

By way of background, counterfeiting of credit cards at the present time is relatively easy and can be accomplished effectively by unsophisticated counterfeiters. In this respect, the ordinary credit card is fabricated from a 20 mil core layer of polyvinyl chloride which is printed to provide information on the front and rear of the card. Laminated to each of these layers is a 5 mil clear polyvinyl chloride sheet through which the printing can be seen. The total thickness of the card is 30 mils and it can be fabricated by the use of commercially available material. Thus, counterfeiters can obtain the basic materials for making a credit card from normal commercial channels, and with a minimum of equipment, may duplicate credit cards. It is with overcoming the foregoing ease of counterfeiting that the present invention is concerned.

A search hereon has revealed the following U.S. Pat. Nos.:

| Pat. No. | Issued | Inventor(s) |
| --- | --- | --- |
| 3,399,473 | September 3, 1968 | Jaffe |
| 3,624,938 | December 7, 1971 | Richard |
| 3,787,839 | January 22, 1974 | Fayling |
| 4,109,689 | July 18, 1978 | Broune |
| 4,432,567 | February 21, 1984 | Stockburger |

Jaffe '473 relates to a combination credit card and is really just an electric switch. Richard '938 relates to a foolproof credit card and, like Jaffe '473, is really just an electric switch. Fayling '839 relates to a magnetic viewer device having movable anisotropic elements. It is complicated to manufacture and assemble, bulky and costly, and may not be altogether reliable. Broune '689 relates to a transaction card, having permanent indicia for designating an authorized user of the card. One or more rotatable discs with coded indicia thereon may be viewed through a window to complete a coded designation of authorized use. The Broune device is easy to make and low in cost, but the code must be previously known to restaurants, hotels, and so forth. Furthermore, Broune is not concerned and does not deal with magnetic stripes. Stockburger et al. '567 relates to an authorization card with one or more storing zones for storing information defining the extent of authorization, for example credit information in the case of a credit card. The card is complicated to make and use by a card owner. These prior patents are believed to be irrelevant to the patentability of the present invention.

In U.S. Pat. No. 3,762,081 issued Oct. 2, 1973, to Armbruster et al. for a Credit Card, there is disclosed a credit card construction which utilizes slots and mechanically movable members or tabs positioned in said slots. The members are movable to any one of a plurality of defined, index positions. In order to use the credit card, the movable members must be set in appropriate positions. The card is then "read" by identification apparatus such as a cash register computer billing terminal. When not in use the tabs are displaced from the correct "combination" positions.

The prior art credit card construction described, while providing a good means to prevent unauthorized use of a credit card, has the disadvantage of not being compatible with many credit card systems. Moreover, a complex combination of numbers may necessarily need to be committed to memory. This would be a burdensome task for the credit card user in the event he owns a number of such cards. The present invention contemplates an improvement over the prior art structure utilizing some of the basic principles associated with the prior art structure.

Important objects of the present invention are to provide an antifraud credit card that is of the utmost simplicity and ease of use and minimum cost while at the same time is highly effective in preventing misuse of the credit card. The manner in which the invention attains these objects of the invention will become apparent hereinafter.

Numerous innovations for an digitized finger print credit card have been provided in the prior art that are described as follows. Even though these innovations may be suitable for the specific individual purposes to which they address, they differ from the present invention as hereinafter contrasted.

U.S. Pat. No. 3,050,711 to Harmon uses a cathode ray scanner but places transducer elements about a plurality of circles. The result is that it is impossible with this approach to obtain scans of sufficiently small orbits at any one location of his transducer to effect character recognition of the type needed in fingerprint analysis. When it is considered that the diameter of a cathode ray beam is in the order of 0.001 inches, it can be understood why it is impossible to evaluate light and dark spots at any one location of the transducers used herein due to the practical dimension of the transducer itself being larger than the details of recognition required within the confines of any one transducer area.

U.S. Pat. No. 3,112,468 to Kamentsky shows a character recognition device, but the polar scan taken herein is an overall polar scan of the entire character or pattern. This art does not have embodied therein means for sequentially positioning the beam of the cathode ray spot scanner at coordinate locations along rectilinear axes including means for sequentially scanning the pattern at each of the coordinate locations with a plurality of scans wherein each of the scans are a plurality of successive polar scans having polar radii of different magnitudes for scanning a plurality of portions of each of the coordinate locations, which are needed to obtain the high resolution requirements of a fingerprint analysis or minutia device.

U.S. Patent No. Sprick, although this is in character analysis field, is inadequate for fingerprint analysis requirements. It does not teach storing digital data for each point of each polar scan at each XY coordinate position and fails with respect to the need for providing means for sequentially comparing digital data for detecting a predetermined relationship between corresponding points of each polar scan. Further, this patent does not provide means for determining the angular orientation of a predetermined pattern relationship relative to a normal axis.

U.S. Pat. No. 3,370,271 to Van Dalen, U.S. Pat. No. 3,293,604 to Klein, U.S. Pat. No. 3,234,513 to Brust, and U.S. Pat. No. 3,496,541 to Haxby, appear to teach variations of linear scanning systems. A linear scanning system exclusively is not adequate for fingerprint analysis, it requires a sequence of ever diminishing areas of polar scans.

U.S. Pat. No. 5,054,090

FINGERPRINT CORRELATION SYSTEM WITH PARALLEL FIFO PROCESSOR

Arnold W. Knight et al.

A method and apparatus for parallel processing "live" and pre-recorded "reference fingerprint data for comparison purposes. An array sensor images a selected portion of a live fingerprint and video means produce corresponding digital live image data. The pre-recorded, multi-pixel reference data and the image data are scanned relative to one another via recirculating First-in-First-Out (FIFO) buffer memories and row and column shift means. Exclusive OR (XOR), summation and accumulation circuitry simultaneously compare the reference and image data over a plurality of correlation cycles and compute a correlation value for each correlation cycle. A microprocessor determines the best correlation value of the reference and image data from a tabular store of correlation values for each correlation cycle relative to a PASS/FAIL threshold.

U.S. Pat. NO. 4,210,899

FINGERPRINT-BASED ACCESS CONTROL AND IDENTIFICATION APPARATUS

Claron W. Swonger et al.

A system including electronic, mechanical and optical mechanisms which enable the system to "read" a human fingerprint directly from a human finger; convert the ridge-valley pattern of that fingerprint into an electronic representation; transmit the electronic representation to a centralized location where image processing computing equipment can locate and extract the distinctive characteristics or minutiae of the fingerprint; compare the minutiae with minutiae previously recorded from the fingerprints of persons whom the system is responsible for identifying; determine whether the identity of the person whose fingerprint is read is known, and, if known, whether or not the person is authorized to enter the portal equipped with this system, or to otherwise act; and, to transmit a signal to the terminal and/or portal regarding the system's decision.

U.S. Pat. No. 3,699,519

FINGERPRINT ANALYSIS DEVICE

Mark E. Campbell

A fingerprint is observed, a small portion at a time, using a flying spot scanner, whose spot travels along a predetermined path at each position to provide an electrical analog signal indicative of the nature of the fingerprint at each position. The analog signal is converted into digital form and temporarily stored in a memory having a plurality of storage elements. The signal stored in the memory is constantly circulated through each of the storage elements to provide for detection of minutiae regardless of their angular orientation. Detecting the occurrence of specified minutia is achieved by sensing the states of selected ones of the storage elements. A method is provided to utilize a finger from which the fingerprint is directly analyzed. Other means are provided to enable the fingerprint pattern to be observed directly and to make a copy of the fingerprint photographically and a combination of optical-electronic and electrostatic methods.

U.S. Pat. No. 3,611,290

FINGERPRINT MINUTIAE READING DEVICE

James A. Luisi

A fingerprint is observed, a small portion at a time, using a flying spot scanner, whose spot travels along a predetermined path at each position to provide an electrical analog signal indicative of the nature of the fingerprint at each position. The analog signal is converted into digital form and temporarily stored in a memory having a plurality of storage elements. The signal stored in the memory is constantly circulated through each of the storage elements to provide for detection of minutiae (i.e. ridge endings, bifurcations, etc.) regardless of their angular orientation. Detecting the occurrence of specified minutiae is achieved by sensing the states of selected ones of the storage elements.

U.S. Pat. No. 5,255,941

Antifraud credit card assembly

Guillermo Solomon

An antifraud credit card assembly includes a card member having first and second faces and a magnetic stripe on the first face and bearing information that is presentable to a sensing machine by a person seeking to consummate a transaction. The credit card assembly further has a movable device for mechanically changing the information provided by the magnetic stripe for selectively presenting to the machine any of a plurality of messages including a single legitimate message that allows consummation of the transaction and a plurality of illegitimate messages that deny such consummation. In one example, the movable device is a slide member, and in another example, the movable device is a rotatable disc. The magnetic stripe may be removable.

U.S. Pat. No. 4,593,936

Universal credit card

George E. Opel

A universal credit card is disclosed that allows a purchaser to make a credit purchase and select any one of a number of pre-established credit lines to charge the purchase to. After an imprint is made from the universal card, a number corresponding to the proper credit line is manually entered onto the charge slip in an array of dots imprinted from the credit card.

U.S. Pat. No. 4,573,711

Secure credit card and method of manufacturing same

Kirk R. Hyde

There is disclosed a method of manufacturing a credit card including the fabrication of a plurality of plastic credit cards, as in sheet form, and then severing such cards into individual personal cards with coded information thereon for identifying the person or account to which the cards relate. Printed on such card is indicia indicating the card is "void". Fabricated separately from the respective cards are strips of hologram material which are sized to act as covers for overlying the "void" indicia and which incorporate optical images which may be characteristic of a particular account or institution to indicate the card is currently active. The indicia covers are stored separate from the cards and are only applied thereto as a last step prior to shipment of the cards from the place of storage to the customer. Consequently, any unauthorized person who gains possession of the cards without the accompanying hologram covers will find the cards ineffective for making unauthorized transactions relating to the accounts identified by such cards.

U.S. Pat. No. 4,223,918

Color coded credit card

Frank E. Smoczynski

A color coded credit card laminate consisting of a plurality of layers of material of different colors of visible thickness laminated relative to each other and extending to all edges of the card, to thereby provide a coded color pattern visible at the edges of the card. A coded credit card laminate consisting of a plurality of layers of material laminated relative to each other including a layer of material containing metal to provide a predetermined conductivity.

U.S. Pat. No. 3,972,138

Credit card

Thomas L. Armbruster and Willliam N. Hill

An improved credit card construction includes visible information embossed thereon as well as the improvement of a slot having at least one magnetizable signal carrying tab movable to a desired index position. The credit card user places the tab in the correct index position to identify the user of the card as the proper user. When the card is not in use, the indexing tab is maintained in some other position in the indexing slot. The construction eliminates misuse of the credit card since only the proper owner knows the appropriate indexing tab position.

U.S. Pat. No. 3,731,085

CREDIT CARD OR THE LIKE

Sten-Lennart Bostrom

A system for checking cards serving as identification document and as proof of authorization, said system comprising; a card serving as identification document and as proof of authorization, comprising visual identification information carrying elements, and at least one recording medium carrying invisible information and comprising a thin sheet of non-magnetizable metal, being a magnetically shielding high-permeable alloy, containing as major components, iron and nickel in which sheet a number of areas having other magnetic properties than the remainder of the sheet are located to provide at least one unamendable authorization code pattern, and means for reading information contained in said cards, and means for checking the information read, and wherein said reading means comprises a slot for inserting said cards, at least one magnetic means located on one side of the inserted card, and magnetically operable means located on the opposite side of said card, the arrangement of at least said magnetically operable means corresponding to all possible code patterns on said sheet, and wherein a number of said magnetically operable means, upon the correct insertion of a card in said slot, are adapted to be magnetically influenced by said magnetic means, in correspondence to the code pattern of said inserted card, and to thereby control said checking means.

U.S. Pat. No. 3,713,235

COMBINATION CREDIT CARD

Heinz Theodore Felix Roberts

A credit card, security pass or like identification device in the form of a panel having a window therein, a display slide located beneath the panel for movements between an effective position (wherein a predetermined portion of the slide is in register with and exposed at the window) and an ineffective position (wherein the predetermined portion is out of register with the window and not visible therethrough) and a plurality of displaceable coded elements cooperating with the slide to prevent its movement to the effective position except in predetermined relative positions thereof.

U.S. Pat. No. 3,637,990

CREDIT CARD VALIDATOR WITH TRANSDUCER-READOUT

Jack E. Bayha and John W. Dixon

An identification number is digitized finger print on a card in the form of a number of areas of closely spaced variations in the planar configuration of the card, the spacing of the variations in a particular area being determined by the digit digitized finger print on that region. The digitized finger print number is read by a device which moves the card at a uniform speed with the variation bearing areas in contact with an electromechanical transducer. As each area passes the transducer a tone, whose frequency is determined by the spacing of the variations of the area and, therefore, identified with the digit digitized finger print in that area, is produced, amplified, and then drives the coil of a resonant-reed relay. The contact of the relay which has a resonant period equal to the generated frequency and corresponding to the digitized finger print digit closes. The reading device compares the number determined by the relay with one manually supplied to it and indicates the identity or nonidentity of the two numbers.

Numerous innovations for drafting devices have been provided in the prior art that are adapted to be used. Even though these innovations may be suitable for the specific individual purposes to which they address, they would not be suitable for the purposes of the present invention as heretofore described.

SUMMARY OF THE INVENTION

An antifraud credit card or identfication card embodying the invention comprises a card member having digitized finger print and bearing information that is presentable to a person seeking to consummate a transaction. The credit card further has a legitimate message that allows consummation of the transaction and a plurality of illegitimate messages that deny such consummation.

The instant invention is a universal credit card. It is of the usual plastic and mylar composition and typical dimensions that ordinary credit cards are of but has on both surfaces a protective, very thin, transparent covering to protect the digitized and actual finger print information stored underneath. The information stored underneath the covering is divided into categories: photographic information; information digitized finger print on a magnetic tape; printed information; written information; digitized finger print embossed or raised-figure information. On the front side of the credit card, identifying information is located: a line of identifying digitized finger print numbers and letters representing the cardholder's digitized finger print with a plurality of spaced apart arrays that allows the inscription of numerous other digits; and the expiration date of the card. On the back side of the credit card may be a strip of magnetic tape with digitized finger print therein. The credit card holder's signature in ink is on the back side of the card on a piece of specially prepared material.

It is therefore an object of the present invention to provide a universal digitized finger print credit card for use by individuals who already have an established credit reputation.

It is an object of this invention to cross reference the actual fingerprint with the digitized fingerprint on the credit card, transmit the digitized fingerprint to a centralized computer where a cross reference of the computer files is conducted. The primary object is to permit, in some cases, a cross check between the digitized fingerprint on the card and the actual fingerprint; In other cases, a three way among the digitized fingerprint on the credit card, the actual fingerprint of the user and the centralized computer which will contain a digitized fingerprint of the card holder. This centralized computer could also contain the credit record to be used.

It is a further object of the present invention to provide a universal digitized finger print credit card that has a current digitized and actual finger print photograph and identifying code having digitized finger print next to the name of the individual.

It is a still further object of the invention to provide a universal digitized finger print credit card that will carry in magnetically coded information such as digitized and actual finger print providing additional security to the credit card holder.

It is a still further object of the invention to provide a method for using the universal digitized finger print type credit card.

Other objects and advantages of the present invention will be readily apparent to those skilled in the art by reading the following brief description of the drawings, detailed description of the preferred embodiment, and the appended claims.

The method of the present invention is characterized by manufacturing credit cards with a warning printed on the face thereof in such a manner that it will be discernable to a merchant or other individual to whom the card is presented for being honored in carrying out a transaction. A cover is constructed of a strip of material having a characteristic digitized finger print that absence of such correct information will present a warning to the merchant.

Other objects and features of the invention will become apparent from consideration of the following description taken in connection with the accompany drawings.

It is one important object of the present invention to code a credit card in such a manner that counterfeiting thereof is made difficult.

It is another object of the present invention to provide an improved digitized finger print credit card which can reveal the area of its issuance by visual inspection, thereby alerting a merchant to the fact that such credit card may not have issued in his particular geographical area. Other objects and attendant advantages of the present invention will readily be perceived hereafter.

The present invention relates to a digitized finger print credit card laminate comprising a plurality of layers of material of different of visible thickness laminated relative to each other and extending to the edge of said card to thereby provide a digitized finger print pattern at the edge of said card. The present invention also relates to a digitized finger print credit card laminate comprising a plurality of layers of material laminated to each other including a layer of material containing metal and/or optical features to provide a predetermined conductivity which can be sensed by suitable detecting apparatus. The various aspects of the present invention will be more fully understood when the following portions of the specification are read in conjunction with the accompanying drawings wherein:

The present invention contemplates utilization of a standard credit card format, with embossed information on the face of the card and, optionally, a magnetic tape attached to the card.

It is thus an object of the present invention to provide an improved credit card encoding digitized and actual finger print.

It is a further object of the present invention to provide a credit card encoding digitized and actual finger print incorporating features of many presently available credit cards and also providing the additional feature of a encoding digitized and actual finger print that prevents unauthorized use of the credit card.

It is another object of the present invention to provide a credit card encoding having digitized finger print serving to identify the correct user of the credit card.

Still another object of the present invention is to provide a credit card encoding having a magnetic strip to represent digitized finger print providing an identification means for the authorized user and of the credit card.

An object of this invention is to provide a device as aforesaid embodying means whereby the possibility of use being used by unauthorized persons is minimized.

It is an object of this invention to provide a fingerprint-based access control system which can read a human fingerprint directly from a human finger.

It is an additional object of this invention to provide a system for providing a limited access to areas by individuals by identifying them through their fingerprints.

It is a further object of this invention to record timekeeping and payroll data as well as to log personnel entry/exit to specific areas.

It is an additional object of this invention to provide a positive identification system for banking and credit card transactions.

It is an additional object of this invention to extract and use the unique personal characteristics of fingerprints which are derived and used by law enforcement agencies to that data on individuals attempting an unauthorized access can be forwarded to the agencies for action.

It is a still further object of this invention to provide a fingerprint-based access control system which is readily digitized finger print to cover changes in personnel. These objects, and others as will be apparent hereinafter, are accomplished by the present invention.

It is a further object of the present invention to provide a novel fingerprint minutiae reading device.

It is still another object of the present invention to provide a system for detecting the position and orientation of specified minutiae in a fingerprint.

Accordingly, it is a primary object of the present invention to provide a low cost, dedicated, hardware implemented correlation system for fingerprint identification.

It is a further object of the invention to restrict the scanned portion of the total fingerprint area to avoid problems with skin distortion and skew.

It is an additional objective of this invention to provide a fingerprint based access control system for computer data bases and other computer files that presently require a password.

It is also an objective of this invention to provide additional unique identification features to drivers licenses, alien identification cards and a universal health card, college identification (meal card), etc.

According to the present invention, there is provided a system for automatically providing an indication of the position and angular orientation of specified minutiae in a fingerprint. The proposed system is fundamentally very simple and can be implemented with existing off-the-shelf, commercial, electronic components. The present system can be used to detect any type of minutiae such as ridge endings and/or bifurcations, as required. The system will detect as many specified minutiae as possible with a minimum number of false alarms.

Briefly, the present fingerprint minutiae reading device operates by sequentially observing small portions of a fingerprint, with the use of a flying spot scanner, to derive, at each position, an electrical analog signal indicative of the pattern at the position. The analog signal, so derived is converted into digital form and temporarily stored in a small memory having a plurality of storage elements. The signal in the memory is constantly circulated through each of the storage elements to aid in the recognition of minutiae regardless of their angular orientation. Finally, the occurrence of specified minutiae is detected by sensing the states of selected ones of the storage elements. An automatic contract control circuit adjusts the detection process as a function of the local quality of the fingerprint image to increase the probability of detection of minutiae in prints of relatively poor quality. The system includes apparatus to inhibit the recognition of false ridge endings in broken ridges, the terminations of ridges at the print boundaries, or the termination of ridges produced by scars, and, if it becomes desirable to recognize the existence of scars, etc., the ridge endings produced by scars may be detected and recorded for later processing.

It is therefore an object of the present invention to provide a system for detecting specified patterns.

It is a further object of the present invention to provide a novel fingerprint minutiae reading device.

It is still another object of the present invention to provide a system for detecting the position and orientation of specified minutiae in a fingerprint.

It is another object of the presently invention to provide a fingerprint minutiae reading device in which a digitized image of the fingerprint is stored in a temporary memory and in which the image in the memory is circulated to assist in the detection of minutiae having arbitrary angular orientations. It is still another object of the present invention to provide a fingerprint minutiae reading device which includes an automatic contract control circuit to permit adaptation to the local quality of a fingerprint image.

Still another object of the present invention is the provision of a fingerprint minutiae reading device which may be implemented with existing off-the-shelf, commercial, electronic components.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

FIG. 3 is a side view of the credit card finger print scanning apparatus exhibiting externally located features such as the green indicator light, angled front face which the finger print scanner door is openable by a hinge, credit card, access door, as well as internally located features such as the magnetic credit card scanner having a complimentary digitized credit card finger print scanner, a finger print scanning screen with a finger print scanner with a finger print alignment tool located underneath having an optical reader comprising a scanner therein positioned on a mounting bracket.

FIG. 4 is a perspective cross sectional view exhibiting externally located features such as the angled front face which the finger print scanner door openable by a hinge, access door, as well as internally located features such as the magnetic credit card scanner having a complimentary digitized credit card finger print scanner, a finger print scanning screen with a finger print scanner with a finger print alignment tool located underneath having an optical reader comprising a scanner therein positioned on a mounting bracket.

DETAILED DESCRIPTION OF THE PREFERRED EMBODIMENT

Figure 1:
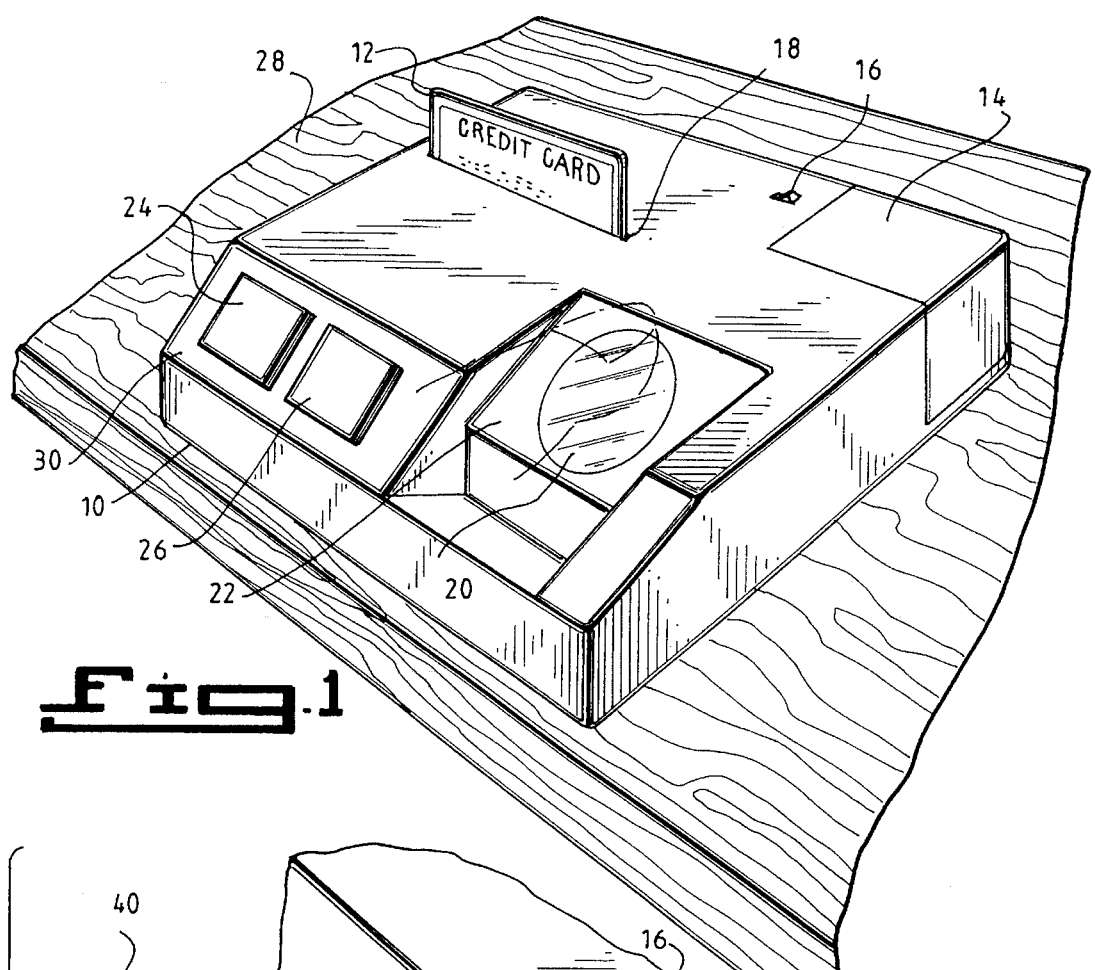
FIG. 1 is a perspective view of a credit card finger print reading apparatus on top of a print of an authorized credit card holder being scanned by the apparatus whereas the credit card is inserted in the credit card insertion slot. The apparatus further exhibiting an access door housing auxiliary power means and a power on/off switch. The card holder places his/her finger on the fingerprint scanning screen located on the angled front face and the fingerprint is scanned by the finger print scanner. If the finger print scanned by the finger print scanner and the finger print scanned on the credit card do not match then the red indicator light illuminates alerting the user that a fraudulent transaction is about to take place. If the green indicating light illuminates, then the user is alerted that the card and card holder are valid.

Referring now to FIG. 1 which is a perspective view of a credit card finger print reading apparatus 10 on top of a table 28 exhibiting a credit card 12 containing therein an actual and/or digitized finger print of an authorized credit card holder being scanned by the apparatus 10 whereas the credit card is inserted in the credit card insertion slot 18. The apparatus 10 further exhibiting an access door 14 housing auxiliary power means 32 and a power on/off switch 16. The card holder places his/her finger on the fingerprint scanning screen 20 located on the angled front face 30 and the fingerprint is scanned by the finger print scanner 22. If the finger print scanned by the finger print scanner 22 and the finger print scanned on the credit card do not match then the red indicator light 24 illuminates alerting the user that a fraudulent transaction is about to take place. If the green indicating light 26 illuminates, then the user is alerted that the card and card holder are valid.

Figure 2:
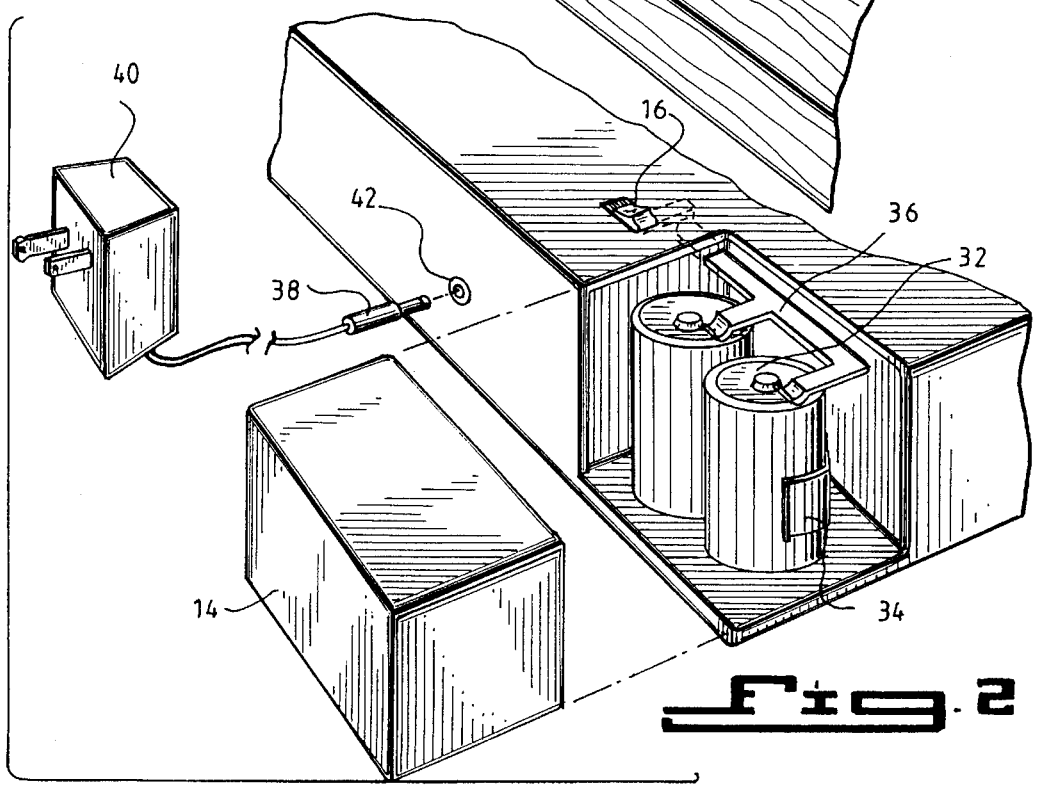
FIG. 2 is an enlarged perspective view of the auxiliary power source exhibiting the power on/off switch, as well as other internally located features which become apparent when the access door is removed revealing a battery terminal clamp, electric terminals and recharging unit having a male plug which integratedly fits into the female plug located on the credit card finger print scanning apparatus.

Referring now to FIG. 2 which is an enlarged perspective view of the auxiliary power source 32 exhibiting the power on/off switch 16, as well as other internally located features which become apparent when the access door 14 is removed revealing a battery terminal clamp 34, electric terminals 36 and recharging unit 40 having a male plug 38 which integratedly fits into the female plug 42 located on the credit card finger print scanning apparatus 10.

Referring now to FIG. 3 which is a side view of the credit card finger print scanning apparatus 10 exhibiting externally located features such as the green indicator light 26, angled front face 30 which the finger print scanner door 44 is openable by a hinge 46 revealing finger print scanner 50 mounted on a bracket 56, credit card 12, access door 14, as well as internally located features such as the magnetic credit card scanner and complimentary digitized credit card finger print reader 48, a finger print scanning screen 20 with belt 52, finger print line sensor 58 located underneath and pulleys 54.

Referring now to FIG. 4 which is a perspective cross sectional view exhibiting externally located features such as the angled front face 30 which the finger print scanner door 44 openable by a hinge 46, access door 14, as well as internally located features such as the magnetic credit card reader 48 described above, a finger print scanning screen 20 with a finger print scanner 50 with a scanning bar 58 located underneath having an optical reader 54 belt 52 and pulleys 54.

Figure 5:
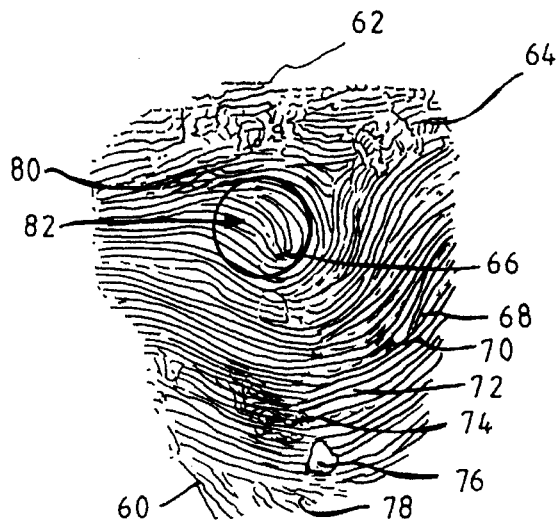
FIG. 5 is an enlarged top view of a finger print comprising a finger print top, ridges, finger print center, finger print sides, bumps, valleys, plateaus, divots, finger print bottom, sequential bumps and a finger print alignment spot thereby the optical scanning device self aligns.

Referring now to FIG. 5 which is an enlarged top view of a finger print 60 comprising a finger print top 62, ridges 64, finger print center 66, finger print sides 68, bumps 70, valleys 72, plateaus 74, divots 76, finger print bottom 78, sequential bumps 80 and a finger print alignment spot 82 thereby the optical scanner 52 device self aligns. During the optical scanning of the fingerprint 60 by the optical scanner 52, the finger print is digitized by the optical scanner 52 translating physical features of the finger print into a digitized form using binary numbers such as 0 and 1. Thus, for example when the optical scanner 52 reads the following set of finger print 60 physical features such as; (1) bump 70, (2) valleys 72, (2) plateaus 74, (3) divots 76, 910 sequential bumps 80, and (4) ridges 64, a digitized representation may read such as 1 00 1111 000000 1111 11111111, hence, (1) bump 70 represents (1) 1 digit, (2) valleys 72 represents (2)

0 digits, (2) plateaus 74 represents (4) 1 digits, (3) divots 76 represents (6) 0 digits, (1) sequential bump 80 represents (4) 1 digits, and (4) ridges 64 represents (8) 1 digits, respectively. It is obvious to one skilled in the art of optical scanning and computer digitization that the physical features of the fingerprint 60 may be assigned any binary or other code to represent said features.

Figure 6:
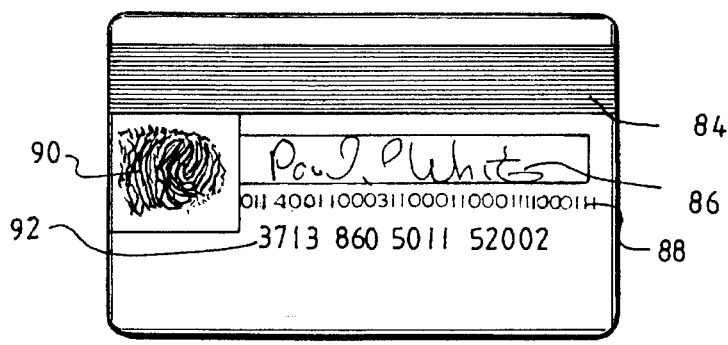
FIG. 6 is a back view of a credit card having a magnetic tape, signature, digitized finger print, reduced enhanced finger print image, and credit card number on back.

Referring now to FIG. 6 which is a back view of a credit card having a magnetic tape 84, signature 86, digitized finger print 88, reduced enhanced finger print image 90, and credit card number on back 92.

Figure 7:
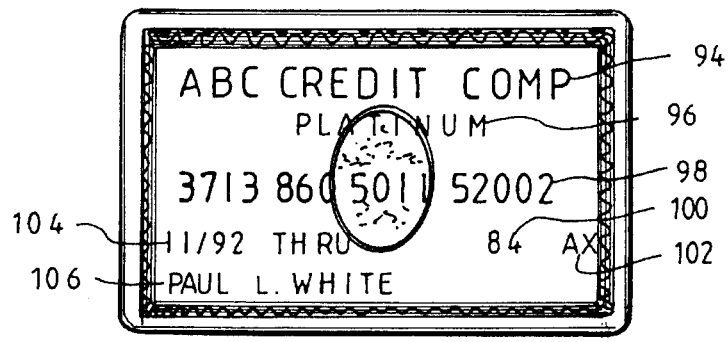
FIG. 7 is a front view of a credit card having a name of credit card, type of credit card, credit card number on front, first issue date, credit ID, expiration date, and name of credit card holder.

Referring lastly to FIG. 7 which is a is a front view of a credit card having a name of credit card 94, type of credit card 96, credit card number on front 98, first issue date 100, credit card ID 102, expiration date 104, and name of credit card holder 106.

It will be understood that each of the elements described above, or two or more together, may also find a useful application in other types of constructions differing from the type described above.

While the invention has been illustrated and described as embodied in a credit card with digitized finger print, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A digitized finger print credit card verification system comprising, in combination:

a. a credit card having mounted therein a credit card identification number, validation dates, member establishment dates, name of credit card, a representation in binary numerical form of a digitized finger print representing an original card holder's actual finger print, a representation of said actual finger print, a magnetic strip having magnetically thereon a digitized form of said original card holder's finger print, an original card holder's signature space, and an original card holder's name;

b. digitized finger print credit card reading apparatus comprising at least one access door, an on/off switch, a credit card insertion slot having a digitized finger print reader and a magnetic credit card scanner, a finger print scanning screen, a finger print scanner including a line sensor, a plurality of indicator lights to indicate whether there is a finger print match, an angled front face thereon containing said finger print scanning screen and therein containing said finger print scanner, a hingably mounted finger print scanning door, and an auxiliary power source having at least one battery clamp, electric terminals, and a male plug located at a terminus with a corresponding female plug located on said digitized finger print credit card reading apparatus.

\* \* \* \* \*